United States Patent [19]

Lafargue

[11] 4,067,266
[45] Jan. 10, 1978

[54] FOLDING TABLE

[76] Inventor: Jean Lafargue, 21, rue Chevilly, 94262, France

[21] Appl. No.: 766,954

[22] Filed: Feb. 9, 1977

[30] Foreign Application Priority Data

May 20, 1976 France ............................. 76.15214
Oct. 27, 1976 France ............................. 76.32333

[51] Int. Cl.² .............................................. A47B 3/00
[52] U.S. Cl. ..................................... 108/112; 108/80; 108/113
[58] Field of Search ................. 108/112, 113, 80, 82, 108/128

[56] References Cited

U.S. PATENT DOCUMENTS

| 315,650 | 4/1885 | Montant | 108/80 |
| 2,192,337 | 3/1940 | Tiffany | 108/80 X |
| 2,645,539 | 7/1953 | Thompson | 108/113 |
| 2,764,460 | 9/1956 | Nelson | 108/113 |
| 2,913,294 | 11/1959 | Linde | 108/113 |
| 2,978,754 | 4/1961 | Wilson | 108/112 |

FOREIGN PATENT DOCUMENTS 386,882  4/1908  France ............................. 108/80

Primary Examiner—Francis K. Zugel

[57] ABSTRACT

A folding table wherein a top, pivotally coupled to a pair of tubular legs, is also connected by struts to slide members which move within the legs. Latch mechanisms, which are also positioned within the legs, cooperate with the slide members to lock the tabletop in the raised position and a cam-cam follower arrangement couples the latches to the slide members for the purpose of limiting the degree of motion of the top upon initial unlatching. The table is also characterized by a base including retractable casters which are operated by the slide members.

13 Claims, 8 Drawing Figures

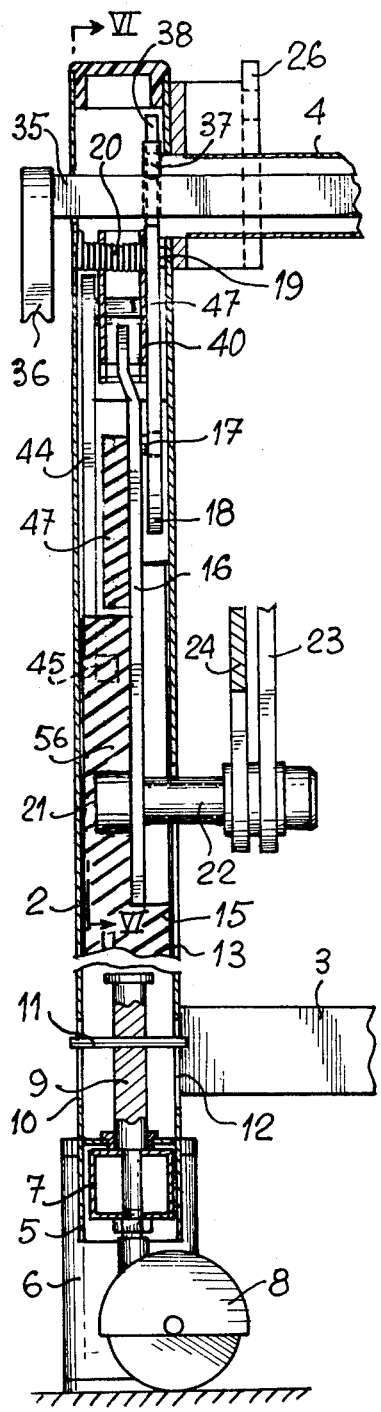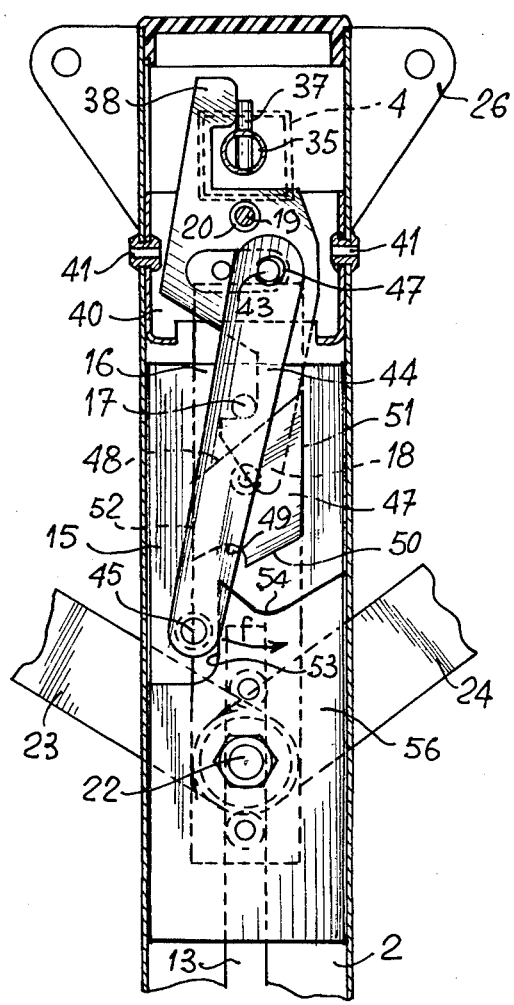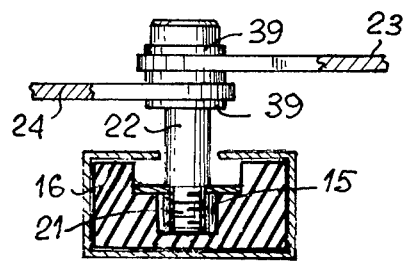

FIG. 7
FIG. 8
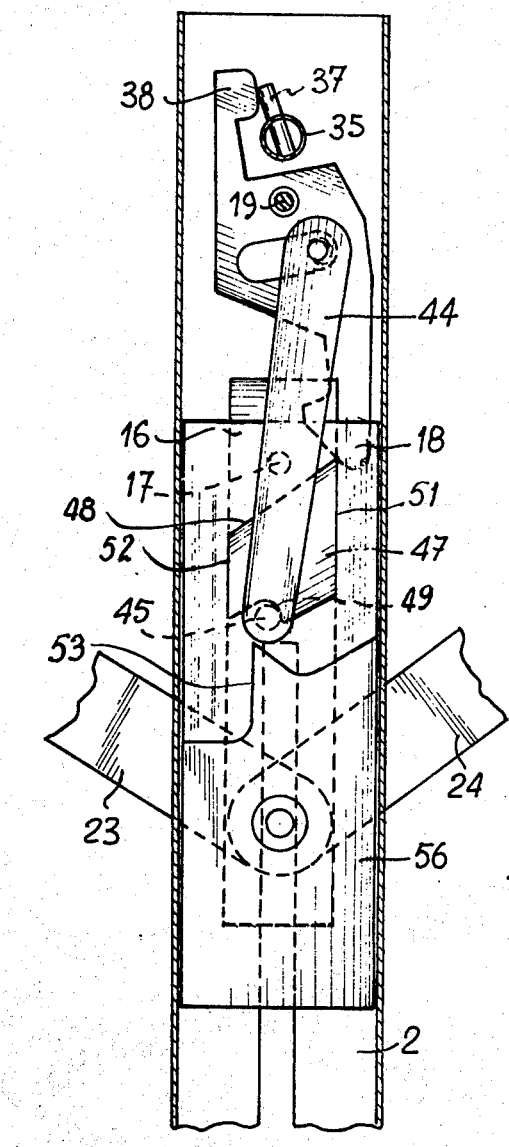
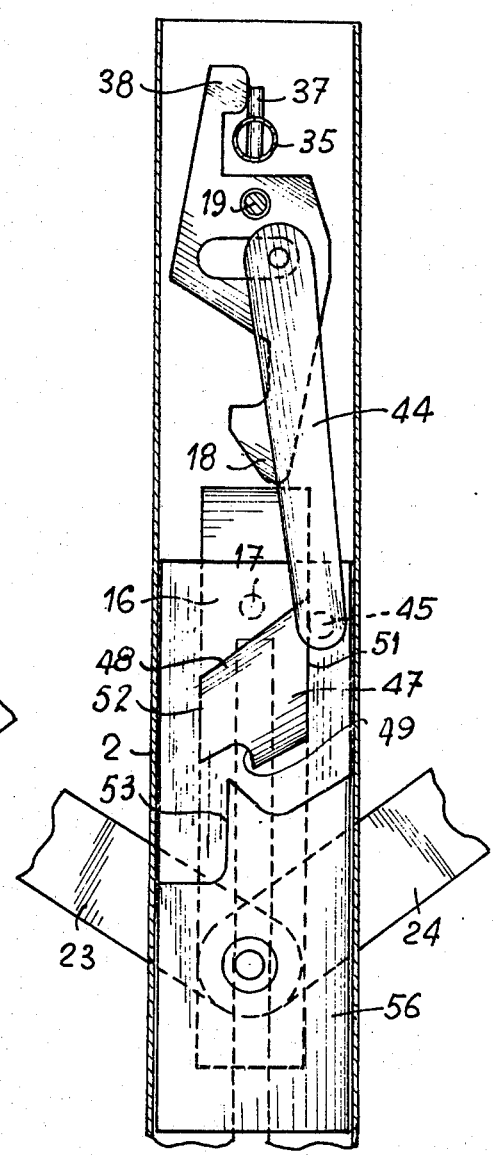

FOLDING TABLE

BACKGROUND OF THE INVENTION

1. Field of the Invention

The present invention relates to collapsible furniture. More specifically, this invention is directed to a novel table which may be folded for storage. Accordingly, the general objects of the present invention are to provide novel and improved apparatus of such character.

2. Description of the Prior Art

Collapsible furniture, and particularly folding tables, are well known in the art. Prior folding tables have, however, been characterized by one or more deficiencies including difficulty in manipulation between the storage and use positions, with tools often being required to make the conversion, and lack of stability when in use. The lack of stability was often evidenced by a collapsing of the table at an inopportune time.

SUMMARY OF THE INVENTION

The present invention overcomes the above briefly discussed and other deficiencies and disadvantages of the prior art by providing a table which may be folded for storage or reassembled for use easily and without the use of any tools and which, when in its use position, is completely stable and not subject to unintended shifting of elements relative to one another. In order to accomplish the preceding general objectives, the table of the present invention comprises a frame having a pair of parallel, vertical uprights which support, at their upper ends, a tabletop. The top is mounted for tilting, about a horizontal axis, so as to be able to occupy use and stored positions. At their lower ends, the vertical uprights are integral with a base which includes casters carried by movable supports connected to the tabletop by means of a kinematic connection. Accordingly, when a tabletop is in the use position the casters will be retracted and the table supported on legs extending from the base and, when in the stowing position, the table will be supported on the casters.

In accordance with a preferred embodiment, the uprights are tubular members which have vertical slots in their facing surfaces. A movable slide member is mounted within each of the uprights and these slide members carry pivot pins which project through the slots. First ends of tabletop supporting struts are coupled to each of these pivot pins and the other ends of the struts are pivotally connected to the tabletop. The preferred embodiment of the invention also comprises means for locking the slide members in the position wherein the tabletop extends horizontally.

The means for causing the retraction of the casters, also in accordance with a preferred embodiment, consists of horizontal bars located within the base of the table and capable of a limited degree of vertical movement. Actuating means are coupled to these movable bars and cooperate with the slide members within the uprights to force the bars downwardly thus ringing the casters into contact with the floor when the tabletop is folded down. With the tabletop in the use position, the weight of the table will cause the casters to move upwardly relative to the base and the table will be immobilized and supported on rigid legs which extend downwardly from the table base.

The means for locking the tabletop in the horizontal or use position includes, in the preferred embodiment, spring loaded latches which engage projections of the slide members; the slide members being coupled to the tabletop via struts as mentioned above. The slide members may be released from the latches by means of rotating a handle which is mechanically coupled to the latches and causes the latches to pivot against the tension of a biasing spring.

The preferred embodiment of the invention is further characterized by a safety mechanism, in the form of at least a first cam carried by a slide member, which cooperates with an arm pivotally attached to a latch member. The cam is shaped such that, should the handle be inadvertently operated, only a slight degree of movement of the tabletop will be permitted before a projection on the arm is captured in a notch in the cam thereby preventing downward movement of the slide member and folding of the table. Further folding is permitted only as a result of physically raising the unlatched tabletop slightly by hand to free the projection on the arm from its capture by the cam on the slide member.

In accordance with one embodiment of the invention the tabletop is defined by two half-tops which are pivoted symmetrically relative to a vertical plane passing through a pair of parallel uprights. Each of these table half-tops is pivotally connected to a pair of struts which, in turn, are pivotally connected to the slide members which travel within the uprights.

Another feature of a table in accordance with a preferred embodiment of the invention resides in the fact that, in the stowed position, the tabletops and their supporting struts are moved beyond an equilibrium position and thus become self-locking. In this locked position the weight of the table cannot cause an undesired retraction of the casters which, if permitted to occur, would impede movement of the table to a location where it is to be stored.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which:

FIG. 4 is a cross-sectional view, on an enlarged scale, of a portion of the table of the present invention, the view in FIG. 4 being taken along line IV—IV of FIG. 2;

FIG. 5 is a cross-sectional, side elevation view of a table in accordance with the present invention taken along line V—V of FIG. 2;

FIG. 6 is a cross-sectional view taken along line VI—VI of FIG. 5; and

FIGS. 7 and 8 are schematic views, similar to that of FIG. 6, which depict the operation of the invention.

DESCRIPTION OF THE PREFERRED EMBODIMENT

Figure 1:
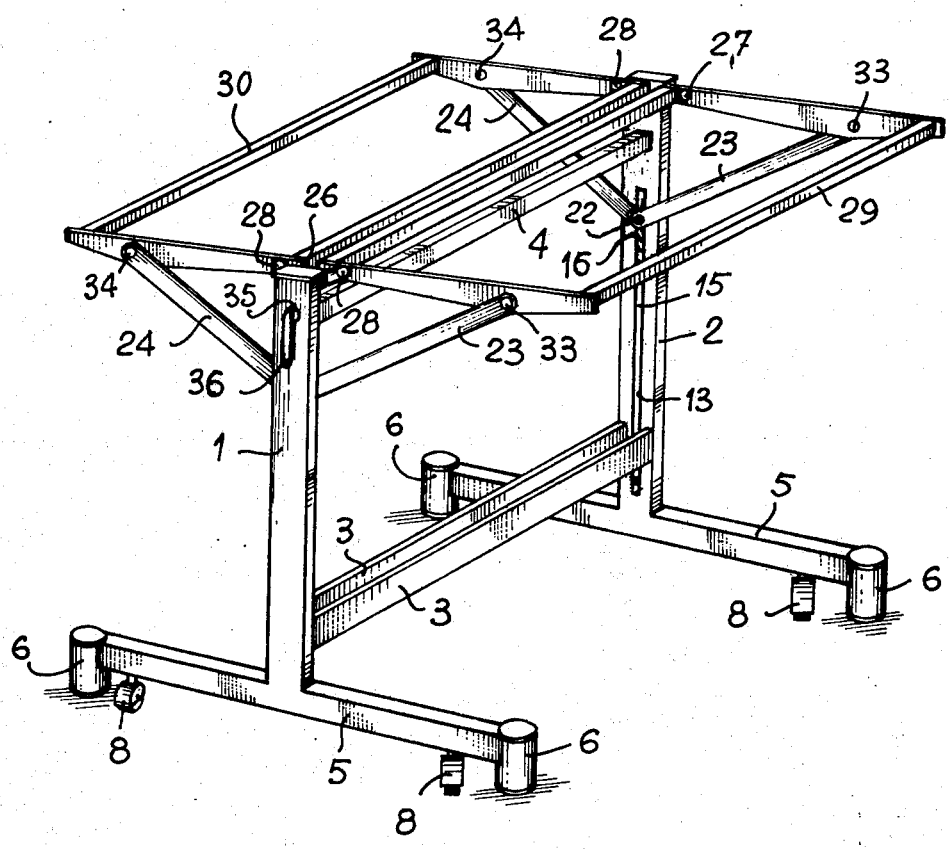
FIG. 1 is a perspective view, with the top removed, of a table in accordance with the present inventon in the use position.

With reference to the drawing, a table in accordance with a preferred embodiment of the invention comprises a pair of vertical legs or uprights 1 and 2. The legs 1 and 2 are formed from tubular stock of rectangular cross-section. Legs 1 and 2 are interconnected adjacent their lower ends by a pair of cross members 3, which are preferably parallel and horizontal, and adjacent their uper ends by a tubular cross member 4. The facing sides of legs 1 and 2 are each provided with a longitudinal slot 13.

The lower ends of legs 1 and 2 are integral with horizontal stabilizer bars 5 which, in the disclosed embodiment, extend in a direction which is transverse to the cross members. As may be seen from a joint consideration of FIGS. 2 and 5, the bars 5 are U-shaped in cross-section with the open end of the channel facing downwardly. A tubular member 7, for supporting casters 8, is mounted within each of the bars 5. In the maner to be described below, the tubular members 7 are capable of vertical movement within the stabilizer bars 5. A rigid foot member 6 is attached to and extends downwardly from each end of each of the bars 5.

Referring to FIG. 5, the movable tubular members 7 are each connected, adjacent their opposite ends, to rods 9 which extend through the tubular members and vertically upwardly into the lower portion 10 of each of legs 1 and 2. Alternatively, to enhance the strength of the table, the lower portion 10 of each of the vertical legs may be provided with a sleeve. The rods 9 are free to move vertically within the sleeves or lower portions 10 of the vertical legs. The rods 9 are provided, intermediate their length, with generally horizontally oriented guide pins 11. The opposite ends of guide pins 11 project through slots in the lower portions of the vertical legs as shown in FIG. 5 and thus guide the movement to rods 9 and tubular members 7 during extension and retraction of casters 8.

Referring to FIGS. 4–6, a slide member or block 15 is mounted for vertical movement within each of legs 1 and 2. Slide members 15 comprise a body of molded plastic material having a metal bar 16 affixed to a first face thereof. The metal bars 16 are each provided with a projection 17. The projections 17 cooperate with latch members 18 which are mounted to the vertical legs by means of pivot pins 19. The latches 18 are capable of rocking movement, as may be seen from a comparison of FIGS. 7 and 8, and are biased to a first position (FIGS. 6 and 8) by springs 20. A nut 21 is embedded in each of the slide members 15. Nuts 21, as may be best be seen from FIG. 4, receive the threaded ends of pivot pins 22. First ends of struts 23 and 24 (FIGS 1 and 2) are pivotally secured to pivot pins 22 by means of split rings 39 which are engaged in grooves in the pivot pins.

Figure 2:
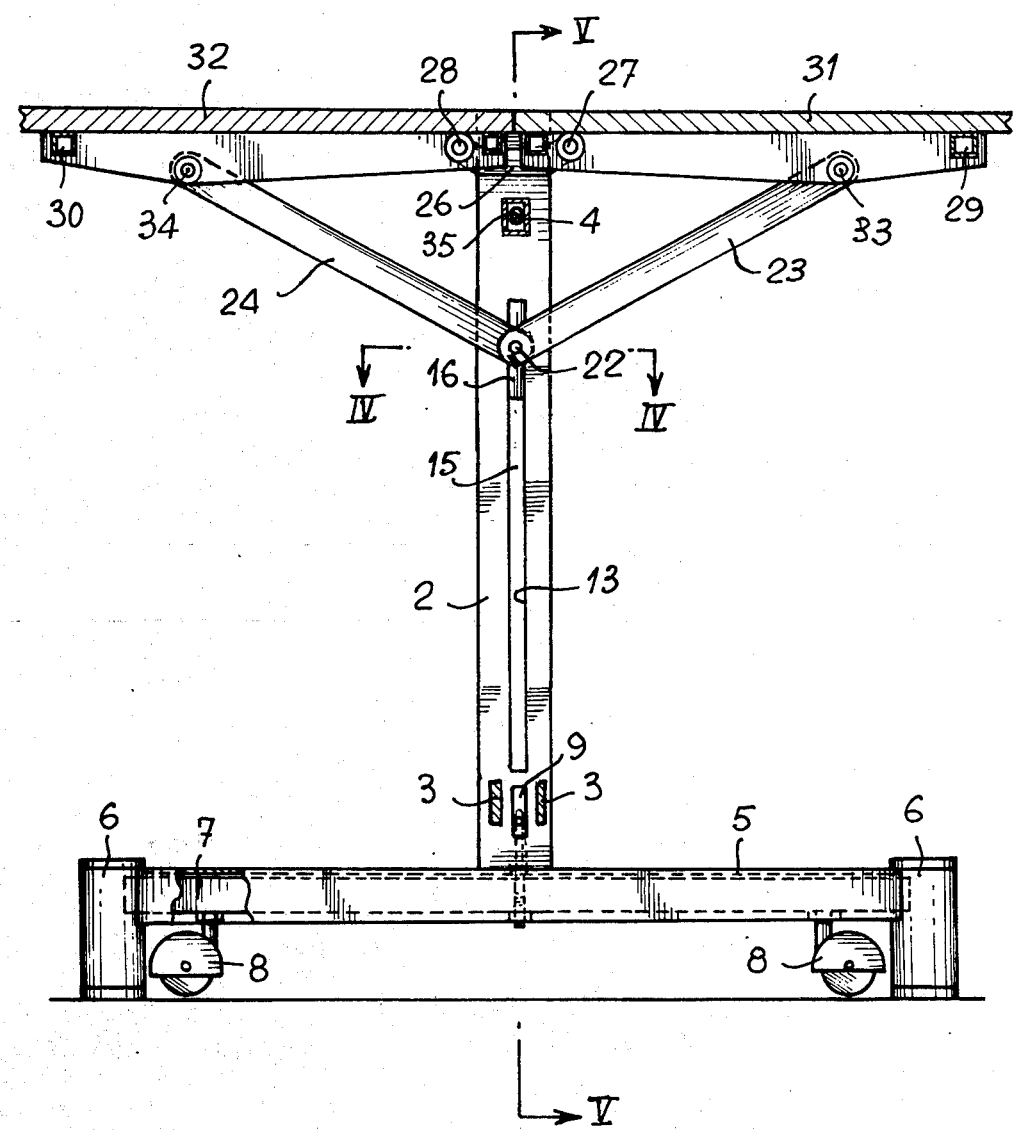
FIG. 2 is a cross-sectional, side elevation view of the table of FIG. 1 with the top installed.

As may best be seen from FIG. 6, and as also shown in FIGS. 1–3 and 5, each of the legs 1 and 2 is provided with an upper end plate 26. The upper end plates 26 support pivot pins 27 and 28. The pairs of pivot pins 27—27 and 28—28, respectively, have rectangular frames 29 and 30 mounted thereon as shown in FIGS. 1 and 2. The frames 29 and 30 respectively support table half-tops 31 and 32. The second ends of the struts 23 are coupled, via pivot pins 33, to the side members of frame 29 while the second ends of struts 24 are coupled, via pivot pins 34, to the side members of frame 30.

Referring jointly to FIGS. 1, 2, 5 and 6, a rod 35 is mounted for rotation about a horizontal axis within the tubular cross member 4. A handle 36 is affixed to the first end of the rod 35. Rod 35 carries, as may be seen from FIGS. 5–8, radially extending studs 37. The studs 37 cooperate with tabs 38 on latches 18 whereby, through the operation of handle 36 and thus the rotation of rod 35, the projections 17 on the slide members 15 may be disengaged from the latches 18 to thereby permit the movement of the slide members within the vertical legs 1 and 2. FIGS. 5 and 6 depict the slide members locked against movement by the latches 18. FIG. 7 shows the releasing of he latch member under the action of the radial studs 37 wherein the studs contact tabs 38 on latches 18 and cause the latches to pivot against the force of the biasing springs 20. FIG. 8 shows the mechanism in the unlatched position wherein the slide members are free to travel within the vertical legs.

Referring again to FIGS. 5 and 6, the pivot pins 19 about which the latches 18 rock are carried by frames 40 which are mounted within and affixed to the vertical legs 1 and 2 by means of fasteners 41. The frames 40 also function as support bearings for pivot pins 43 which extend from lever arms 44. The second ends of the lever arms 44 carry cam follower projections 45. A may be seen from joint consideration of all of FIGS. 5–8, a lever arm 44 is situated at one side of each of frames 40 while a latch 18 is located at the opposite side of each of these frames.

A cam member 47 is mounted on each of the slide members 15. Cam members 47 have the configuration best seen from FIGS. 7 and 8. The cam members 47 are affixed to the metal bars 16 of slide members 15 and have an inclined rise 48, a vertical rise 52, a notch 49, an inclined rise 50 and a vertical rise 51. A cooperating cam is formed on portions 56 of members 15 below cam members 47. This cooperating cam has a vertical rise 53 and a curved contour 54. The vertical rise 53 is offset relative to the rise 52 on cam 47 in the interest of guiding the cam followers 45 on lever arms 44 toward the notches 49 on cam members 47.

The understanding of the operation and construction of a novel folding table in accordance with the present invention will be facilitated from a description of the manner of erection and folding thereof. Assuming the table is in the use position as depicted in FIGS. 1 and 2, the tabletops 31 and 32 will be horizontal and the casters 8 will be withdrawn from contact with the floor. To fold the table the handle 36 is operated to cause rotation of rod 35 and studs 37 which, in turn, causes the latches 18 to pivot against the springs 20. Pivoting of the latch members 18, in the counterclockwise direction as the apparatus is shown in FIGS. 6–8, will release the projections 17 on bars 16 of sliding members 15 whereby the slide members are fre to move downwardly within the vertical legs 1 and 2. In moving from the position of FIG. 2 to that of FIG. 3, the tabletops 31 and 32 tend to rock about their respective pivots 27—27 and 28—28 because of their weight. As the tabletops rock about their pivots, the struts 23 and 24 push the slide members 15 in the downward direction. The displacement of the slide members 15 is immediately stopped by the engagement of the cam followers 45 on the lever arms 44 with the bottom of the notches 49 in the cams 47 as shown in FIG. 7.

Since rise 53 of cams 47 is offset relative to rise 52 and the pivot pins 43 on which lever arms 44 pivot, the lever arms 44 will have a tendency to move in the direction of the arrow f (FIG. 6). In order to completely free, and thus fold down completely the tabletops 31 and 32, the tops must be raised slightly so that the cam follower projections 45 on lever arms 44 are disengaged from the notches 49 in cams 47. Once this has been accomplished, the folding of the table may proceed from the position shown in FIG. 7 to that in FIG. 8 wherein the slide members 15 move downwardly with the cam followers 45 at the end of lever arms 44 moving along rise 51 on cams 47.

When the slide members 15 come into abutment with the vertical rods 9, the tubular members 7 will be forced downwardly. This downward movement of members 7 results in the support assembly of the table being lifted so that the table will now rest on the casters 8. In this position, as shown in FIG. 3, the table may easily be moved to any desired storage place.

Figure 3:
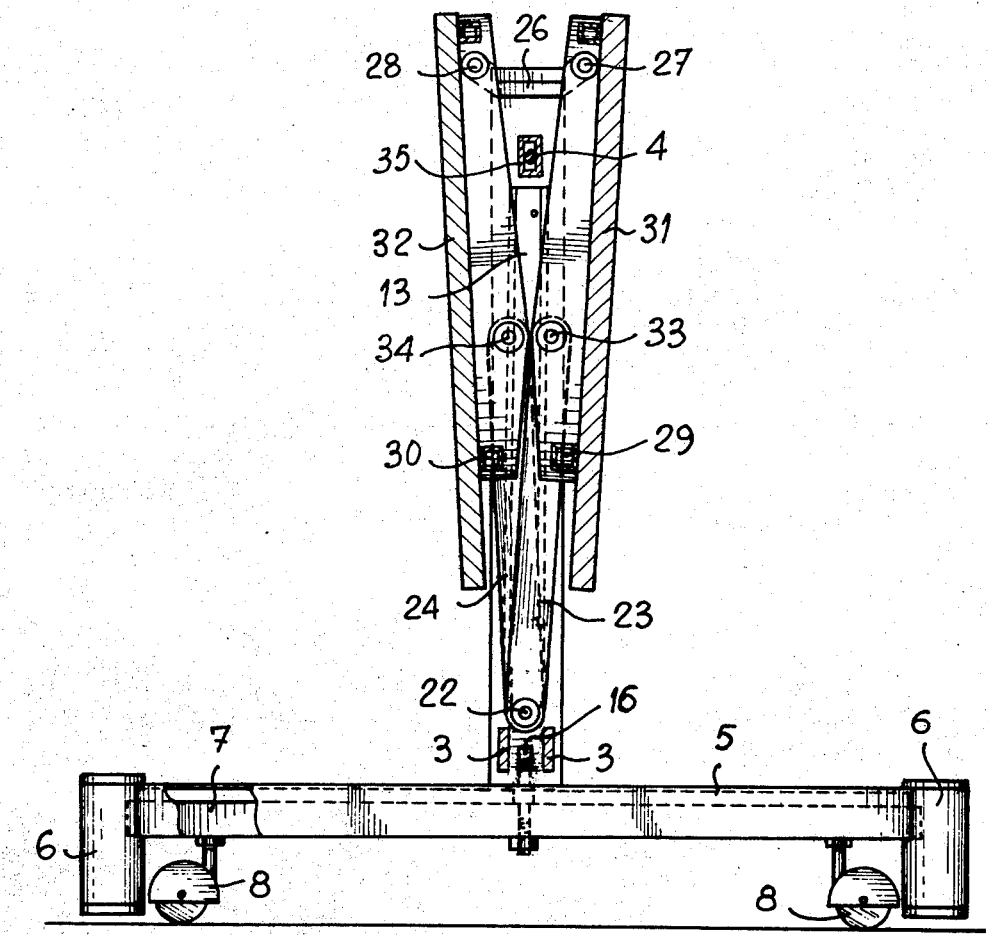
FIG. 3 is a cross-sectional, side elevation view of the table of FIG. 1 in the folded position.

Continuing to refer to FIG. 3, with the table in the folded position the pivots 33 and 34 at which the struts 23 and 24 are respectively joined to frames 29 and 30 occupy a position in whch they are situated beyond the equilibrium position. The equilibrium position, with regard to pivot 33, corresponds to the position wherein the pivots 22, 23 and 27 are in alignment. The equilibrium position for pivot 34 is the position wherein the pivots 22, 34 and 28 are in alignment. With pivots 33 and 34 beyond the equilibrium position, the slide members 15 are unable to move upwardly again in the legs 1 and 2 in response to the weight of the table and thus the table is automatically locked in the folded position.

If it is desired to restore the table to the position for use, tabletops 31 and 32 are manually raised so as to be brought into the horizontal position. During this movement the struts 23 and 24 drive the slide members 15 upwardly. When the cam follower projections 45 on the ends of lever arms 44 again reach the cams 47, the inclined rise 48 causes the lever arms 44 to rock in the opposite direction to that of arrow $f$ (FIG. 6) and the cam followers 45 thus move along rises 48 and vertical rises 52 and drop into the channel defined by the rise 53. When the tabletops 31 and 32 reach the horizontal position the projections 17 on slide members 15 will, by causing rocking of the latch members 18, move to the position shown in FIG. 6 wherein the slide members are again vertically captured by the latch members 18. In this position the table can not again be folded unitl the handle 36 is rotated to unlatch the mechanism.

Thus, it may be seen that a reliable and uncomplicated folding table structure is provided by the present invention and that this table may be used without fear that the top will inadvertently fold downwardly.

While a preferred embodiment has been shown and described, various modifications and substitutions may be made thereto without departing from the spirit and scope of the invention. Accordingly, it will be understood that the present invention has been described by way of illustration and not limitation.

What is claimed is:

1. A folding table comprising:
   a pair of spaced apart legs, said legs being oriented generally vertically and being substantially parallel to one another, said legs each including a tubular member, said tubular members being provided with elongated slots, the slots in said legs being in facing relationship;
   tabletop means;
   base means, said base means being affixed to said legs adjacent the lower ends thereof, said base means including a pair of substantially parallel U-shaped members, each of said base means U-shaped members being affixed intermediate its length to the lower end of a tubular member of one of said legs, the openings of said U-shaped base means members facing downwardly, said base means further including a rigid foot extending downwardly from each end of each of said U-shaped members;
   a plurality of casters;
   a bar mounted within each of said base means U-shaped members, said bars being oriented generally parallelly with said U-shaped members and having said casters affixed thereto;
   a connecting rod extending upwardly from each of said bars into the tubular members of said legs;
   slide means movable within each of said legs, said slide means each including a projection, said slide means contacting the upper ends of said connecting rods when said tabletop means is moved to the stored position whereby said bars and the casters affixed thereto are urged downwardly to thereby raise said feet from the surface on which the table is supported;
   a pivot pin affixed to each of said slide means, said pivot pins respectively extending through and moving along said facing slots in the tubular members of said legs;
   means joining said tabletop means to said legs, said joining means including at least a first strut extending between each of said pivot pins and said tabletop means, said struts being pivotally attached to said pins and tabletop means whereby said tabletop means may pivot between stored and use positions with movement of said slide means; and
   latch means pivotally mounted within each of said legs, said latch means cooperating with said slide means projections to lock said slide means in a first position commensurate with said tabletop means being in the use position.

2. The table of claim 1 wherein said joining means comprises:
   a plate connected to the top of each of said legs; and
   means pivotally connecting said top means to said plate.

3. The table of claim 2 further comprising:
   cam means carried by at least one of said slide means, said cam means including a notch and a plurality of guide surfaces;
   arm means pivotally connected to and extending from at least one of said latch means; and
   cam follower means mounted on the free end of said arm means, said cam follower means cooperating with said cam means notch to limit the motion of said top means upon disengagement of said slide means projection from said latch means, said cam follower means being releasable from said cam means notch by raising said top means.

4. The table of claim 3 wherein said coupling means further comprises:
   means resiliently biasing said latch means into the slide means projection engaging position;
   a rotatable rod extending between said legs; and
   studs extending from said rod within said legs and adjacent each of said latch means whereby rotation of said rod will result in said studs causing pivoting of said latch means against the bias of said biasing means to cause disengagement of said slide means projection by said latch means.

5. The table of claim 4 further comprising:
   a tubular cross member extending between said legs, said rotatable rod being positioned within said cross member.

6. A folding table comprising:
   a pair of spaced apart legs, said legs being oriented generally vertically and being substantially parallel to one another;

tabletop means;

means joining said tabletop means to said legs, said joining means including a pivot connection whereby said tabletop means may pivot between stored and use positions;

base means, said base means being affixed to said legs adjacent the lower ends thereof;

a plurality of casters;

caster support means, said caster support means being movable with respect to said base means to raise and lower said casters with respect thereto;

slide means movable within each of said legs, said slide means cooperating with said caster support means to cause movement thereof, said slide means each including a lock member;

latch means pivotally mounted within each of said legs, said latch means cooperating with said slide means locking members to lock said slide means in a first position commensurate with said tabletop means being in the use position; and means for limiting the pivotal movement of said tabletop means upon disengagement of said slide means locking members from said latch means, said motion limiting means including pivotal linkage means extending between said latch means and said slide means.

7. The table of claim 6 wherein said legs each comprise:

a tubular member, said tubular member being provided with an elongated slot, the slots in said legs being in facing relationship; and wherein said coupling means further comprises:

a pivot pin affixed to each of said slide means, said pivot pins respectively extending through and moving along said facing slots in said tubular members which comprise said legs; and at least a first strut extending between each of said pivot pins and said top means, said struts being pivotally attached to said pins and top means.

8. The table of claim 7 wherein said means for limiting the motion of said top means comprises:

cam means carried by at least one of said slide means, said cam means including a notch and a plurality of guide surfaces;

arm means pivotally connected to and extending from at least said one of said latch means; and cam follower means mounted on the free end of said arm means, said cam follower means cooperating with said cam means notch to limit the motion of said top means upon disengagement of said slide means lock member from said latch means, said cam follower means being releasable from said cam means notch by raising said top means.

9. The table of claim 8 wherein said coupling means further comprises:

means resiliently biasing said latch means into the slide means lock member engaging position;

a rotatable rod extending between said legs; and studs extending from said rod within said legs and adjacent each of said latch means whereby rotation of said rod will result in said studs causing pivoting of said latch means against the bias of said resilient biasing means to cause disengagement of said slide means locking member by said latch means.

10. The table of claim 9 wherein said base means comprises:

a pair of substantially parallel U-shaped members, each of said members being affixed intermediate its length to the base of one of said legs, the opening of said U-shaped members facing downwardly; and a rigid foot extending downwardly from each end of each of said U-shaped members; and wherein said caster support means comprises:

a bar mounted within each of said U-shaped members, said bars being oriented generally parallelly with said U-shaped members and having said casters affixed thereto; and a connecting rod extending upwardly from each of said bars into said tubular legs, the upper ends of said connecting rods being contacted by said slide means when said top means is moved to the stored position whereby said bars and the casters affixed thereto are urged downwardly to thereby raise said feet from the surface on which the table is supported.

11. The table of claim 10 wherein said top means comprises:

a pair of half-tops, said half-tops being symmetrical relative to a vertical plane passing through said legs; and wherein said joining means comprises:

a plate connected to each of said legs adjacent the tops thereof; and means pivotally connecting each of said half-tops to said plate.

12. The table of claim 11 wherein said pivotal connections between said struts and said table half-tops are positioned out of planes in which lie the pivot connections between said plate and table half-tops and said struts and said slide means when the table is in the stored position.

13. The table of claim 6 wherein said tabletop means comprises:

a pair of half-tops, said two half-tops being symmetrical with respect to a vertical plane passing through said legs, said half-tops being independently hinged to said legs by said joining means.

* * * * *